United States Patent
Smith

(10) Patent No.: US 9,430,135 B2
(45) Date of Patent: *Aug. 30, 2016

(54) SYSTEMS AND/OR METHODS FOR PAGING CONTROL INCLUDING SELECTIVE PAGING ELEMENT DISPLAY ACCORDING TO A BINARY SUBDIVISION AND/OR A SERIAL PROGRESSIVE DISPLAY APPROACH

(71) Applicant: e2interactive, Inc., Atlanta, GA (US)

(72) Inventor: James Myron Smith, Redmond, WA (US)

(73) Assignee: e2interactive, Inc., Atlanta, GA (US)

( * ) Notice: Subject to any disclaimer, the term of this patent is extended or adjusted under 35 U.S.C. 154(b) by 184 days.

This patent is subject to a terminal disclaimer.

(21) Appl. No.: 13/632,531

(22) Filed: Oct. 1, 2012

(65) Prior Publication Data

US 2013/0036378 A1 Feb. 7, 2013

Related U.S. Application Data

(63) Continuation of application No. 12/585,321, filed on Sep. 11, 2009, now Pat. No. 8,302,024.

(60) Provisional application No. 61/202,768, filed on Apr. 2, 2009.

(51) Int. Cl.
  *G06F 3/048* (2013.01)
  *G06F 3/0485* (2013.01)
  *G06F 3/0483* (2013.01)

(52) U.S. Cl.
  CPC ......... *G06F 3/04855* (2013.01); *G06F 3/0483* (2013.01)

(58) Field of Classification Search
  USPC ........................................ 715/764, 776, 854
  See application file for complete search history.

(56) References Cited

U.S. PATENT DOCUMENTS

| | | | |
|---|---|---|---|
| 789,106 A | 5/1905 | Seymour | |
| 1,330,368 A | 2/1920 | Boos | |

(Continued)

FOREIGN PATENT DOCUMENTS

| | | |
|---|---|---|
| BR | PI 9813567-8 | 10/2000 |
| BR | 0101819-1 | 2/2003 |

(Continued)

OTHER PUBLICATIONS

"Man accused in Lego selling scam", http://www.kptv.com/Global/story.asp?S=4137050&nav=muni156_2, Nov. 18, 2005, 1 page.

(Continued)

*Primary Examiner* — Matthew Ell
(74) *Attorney, Agent, or Firm* — Landmark Intellectual Property Law, PLLC

(57) ABSTRACT

Certain exemplary embodiments disclosed herein relate to paging systems and methods that help users navigate through large or small datasets. For example, in certain exemplary embodiments, paging control elements are provided according to either a binary subdivision approach or a serial progressive approach. Paging control elements are displayed according to either the binary subdivision approach or the serial progressive approach in dependence on a determination as to which approach is more advantageous based at least in part on factors such as, for example, total number of pages, current page location, distance to end points, screen size, etc.

18 Claims, 4 Drawing Sheets

(56) References Cited

U.S. PATENT DOCUMENTS

| | | |
|---|---|---|
| 1,393,489 A | 10/1921 | Boos |
| 1,476,819 A | 12/1923 | Hope |
| 4,312,037 A | 1/1982 | Yamakita |
| 4,414,467 A | 11/1983 | Gould et al. |
| 4,458,802 A | 7/1984 | MacIver et al. |
| 4,563,739 A | 1/1986 | Gerpheide et al. |
| 4,598,810 A | 7/1986 | Shore et al. |
| 4,668,150 A | 5/1987 | Blumberg |
| 4,734,005 A | 3/1988 | Blumberg |
| 4,750,119 A | 6/1988 | Cohen et al. |
| 4,789,054 A | 12/1988 | Shore et al. |
| 4,792,018 A | 12/1988 | Humble et al. |
| 4,803,348 A | 2/1989 | Lohrey et al. |
| 4,812,629 A | 3/1989 | O'Neil et al. |
| 4,814,592 A | 3/1989 | Bradt et al. |
| 4,839,505 A | 6/1989 | Bradt et al. |
| 4,858,743 A | 8/1989 | Paraskevakos et al. |
| 4,866,661 A | 9/1989 | De Prins |
| 4,871,054 A | 10/1989 | Murray |
| 4,884,212 A | 11/1989 | Stutsman |
| 4,893,705 A | 1/1990 | Brown |
| 4,896,024 A | 1/1990 | Morello et al. |
| 4,903,815 A | 2/1990 | Hirschfeld et al. |
| 4,967,906 A | 11/1990 | Morello et al. |
| 4,984,155 A | 1/1991 | Geier et al. |
| 4,997,076 A | 3/1991 | Hirschfeld et al. |
| 5,007,518 A | 4/1991 | Crooks et al. |
| 5,020,958 A | 6/1991 | Tuttobene |
| 5,028,766 A | 7/1991 | Shah |
| 5,042,686 A | 8/1991 | Stucki |
| 5,128,520 A | 7/1992 | Rando et al. |
| 5,128,527 A | 7/1992 | Kawai et al. |
| 5,133,441 A | 7/1992 | Brown |
| 5,139,384 A | 8/1992 | Tuttobene |
| 5,143,193 A | 9/1992 | Geraci |
| 5,159,560 A | 10/1992 | Newell et al. |
| 5,216,612 A | 6/1993 | Cornett et al. |
| 5,231,569 A | 7/1993 | Myatt et al. |
| 5,256,863 A | 10/1993 | Ferguson et al. |
| 5,257,741 A | 11/1993 | Rode et al. |
| 5,273,183 A | 12/1993 | Tuttobene |
| 5,311,424 A | 5/1994 | Mukherjee et al. |
| 5,367,148 A | 11/1994 | Storch et al. |
| 5,372,386 A | 12/1994 | Mills |
| 5,375,240 A | 12/1994 | Grundy |
| 5,414,252 A | 5/1995 | Shinoda et al. |
| 5,416,306 A | 5/1995 | Imahata |
| 5,478,990 A | 12/1995 | Montanari et al. |
| 5,520,990 A | 5/1996 | Rotermund |
| 5,521,815 A | 5/1996 | Rose, Jr. |
| 5,537,314 A | 7/1996 | Kanter |
| 5,541,394 A | 7/1996 | Kouchi et al. |
| 5,581,064 A | 12/1996 | Riley et al. |
| 5,602,377 A | 2/1997 | Beller et al. |
| 5,671,279 A | 9/1997 | Elgamal |
| 5,712,989 A | 1/1998 | Johnson et al. |
| 5,721,832 A | 2/1998 | Westrope et al. |
| 5,737,726 A | 4/1998 | Cameron et al. |
| 5,745,036 A | 4/1998 | Clare |
| 5,799,285 A | 8/1998 | Klingman |
| 5,804,803 A | 9/1998 | Cragun et al. |
| 5,857,175 A | 1/1999 | Day et al. |
| 5,889,270 A | 3/1999 | Van Haagen et al. |
| 5,890,138 A | 3/1999 | Godin et al. |
| 5,895,453 A | 4/1999 | Cook |
| 5,913,210 A | 6/1999 | Call |
| 5,918,213 A | 6/1999 | Bernard et al. |
| 5,918,214 A | 6/1999 | Perkowski |
| 5,949,335 A | 9/1999 | Maynard |
| 5,950,173 A | 9/1999 | Perkowski |
| 5,966,450 A | 10/1999 | Hosford et al. |
| 5,968,110 A | 10/1999 | Westrope et al. |
| 5,978,774 A | 11/1999 | Rogers et al. |
| 5,984,508 A | 11/1999 | Hurley |
| 6,014,635 A | 1/2000 | Harris et al. |
| 6,016,480 A | 1/2000 | Houvener et al. |
| 6,018,719 A | 1/2000 | Rogers et al. |
| 6,025,780 A | 2/2000 | Bowers et al. |
| 6,029,139 A | 2/2000 | Cunningham et al. |
| 6,029,141 A | 2/2000 | Bezos et al. |
| 6,039,244 A | 3/2000 | Finsterwald |
| 6,049,778 A | 4/2000 | Walker et al. |
| 6,055,511 A | 4/2000 | Luebbering et al. |
| 6,064,979 A | 5/2000 | Perkowski |
| 6,085,167 A | 7/2000 | Iguchi |
| 6,085,172 A | 7/2000 | Junger |
| 6,105,001 A | 8/2000 | Masi et al. |
| 6,115,690 A | 9/2000 | Wong |
| 6,119,099 A | 9/2000 | Walker et al. |
| 6,119,164 A | 9/2000 | Basche |
| 6,125,352 A | 9/2000 | Franklin et al. |
| 6,131,088 A | 10/2000 | Hill |
| 6,134,533 A | 10/2000 | Shell |
| 6,148,249 A | 11/2000 | Newman |
| 6,154,738 A | 11/2000 | Call |
| 6,219,652 B1 | 4/2001 | Carter et al. |
| 6,222,914 B1 | 4/2001 | McMullin |
| 6,269,344 B1 | 7/2001 | Junger |
| 6,317,028 B1 | 11/2001 | Valiulis |
| 6,463,421 B2 | 10/2002 | Junger |
| 6,536,659 B1 | 3/2003 | Hauser |
| 6,542,933 B1 | 4/2003 | Durst et al. |
| 6,550,685 B1 | 4/2003 | Kindberg |
| 6,554,187 B2 | 4/2003 | Otto |
| 6,606,608 B1 | 8/2003 | Bezos |
| 6,697,812 B1 | 2/2004 | Martin |
| 6,746,053 B1 | 6/2004 | Afzali-Ardakani et al. |
| 6,757,663 B1 | 6/2004 | Rogers et al. |
| 6,816,174 B2 | 11/2004 | Tiongson et al. |
| 6,834,268 B2 | 12/2004 | Junger |
| 6,933,848 B1 | 8/2005 | Stewart et al. |
| 6,947,941 B1 | 9/2005 | Koon |
| 6,965,866 B2 | 11/2005 | Klein |
| 7,000,834 B2 | 2/2006 | Hind et al. |
| 7,100,119 B2 | 8/2006 | Keely |
| 7,117,227 B2 | 10/2006 | Call |
| 7,118,478 B2 | 10/2006 | Fayter et al. |
| 7,143,055 B1 | 11/2006 | Perkowski |
| 7,162,440 B2 | 1/2007 | Koons |
| 7,376,572 B2 | 5/2008 | Siegel |
| 7,379,899 B1 | 5/2008 | Junger |
| 7,415,617 B2 | 8/2008 | Ginter et al. |
| 7,455,230 B2 | 11/2008 | Junger et al. |
| 7,509,585 B1 | 3/2009 | Gauthier |
| 7,580,860 B2 | 8/2009 | Junger |
| 7,693,731 B1 | 4/2010 | Weber et al. |
| 7,729,923 B2 | 6/2010 | O'Connor |
| 7,797,164 B2 | 9/2010 | Junger et al. |
| 7,840,439 B2 | 11/2010 | Junger |
| 7,850,081 B2 | 12/2010 | Swan et al. |
| 7,890,373 B2 | 2/2011 | Junger |
| 2002/0010627 A1 | 1/2002 | Lerat |
| 2002/0032612 A1 | 3/2002 | Williams et al. |
| 2002/0116274 A1 | 8/2002 | Hind et al. |
| 2002/0133425 A1 | 9/2002 | Pederson et al. |
| 2002/0143671 A1 | 10/2002 | Afzali-Ardakani et al. |
| 2003/0050891 A1 | 3/2003 | Cohen |
| 2003/0094494 A1 | 5/2003 | Blanford et al. |
| 2003/0126034 A1 | 7/2003 | Cheney et al. |
| 2003/0141358 A1 | 7/2003 | Hudson et al. |
| 2004/0006514 A1 | 1/2004 | Rogers |
| 2004/0054900 A1 | 3/2004 | He |
| 2004/0153344 A1 | 8/2004 | Bui et al. |
| 2004/0172260 A1 | 9/2004 | Junger et al. |
| 2004/0195341 A1 | 10/2004 | Lapstun et al. |
| 2005/0097054 A1 | 5/2005 | Dillon |
| 2005/0100144 A1 | 5/2005 | O'Connor |
| 2005/0137882 A1 | 6/2005 | Cameron et al. |
| 2006/0175401 A1 | 8/2006 | Roberts |
| 2007/0100761 A1 | 5/2007 | Dillon |
| 2007/0185788 A1 | 8/2007 | Dillon |
| 2008/0008348 A1 | 1/2008 | Metois |
| 2008/0052184 A1 | 2/2008 | Junger et al. |
| 2008/0059226 A1 | 3/2008 | Melker |

(56) References Cited

U.S. PATENT DOCUMENTS

| | | |
|---|---|---|
| 2008/0262948 A1 | 10/2008 | Grady et al. |
| 2009/0150170 A1 | 6/2009 | Junger et al. |
| 2009/0281935 A1 | 11/2009 | Junger |
| 2010/0185533 A1 | 7/2010 | O'Connor |
| 2010/0211896 A1 | 8/2010 | Brown |
| 2010/0235290 A1 | 9/2010 | Junger et al. |
| 2010/0257486 A1 | 10/2010 | Smith |
| 2010/0325020 A1 | 12/2010 | Junger et al. |
| 2011/0016008 A1 | 1/2011 | Maraz et al. |
| 2011/0029397 A1 | 2/2011 | Junger |
| 2011/0066514 A1 | 3/2011 | Maraz |

FOREIGN PATENT DOCUMENTS

| | | |
|---|---|---|
| BR | PI 0503016-1 | 10/2005 |
| BR | PI 0505846-5 | 9/2007 |
| CA | 2374623 | 4/2001 |
| CA | 2404814 | 10/2001 |
| CA | 2408553 | 11/2001 |
| CN | 1177408 | 3/1998 |
| CN | 1289972 | 4/2001 |
| CN | 101068731 | 11/2007 |
| CN | 101089871 | 12/2007 |
| DE | 3 315 724 | 10/1984 |
| EP | 0 068 642 | 1/1983 |
| EP | 0 191 636 | 8/1986 |
| EP | 0 286 130 | 10/1988 |
| EP | 0 349 284 | 1/1990 |
| EP | 0 845 749 | 6/1998 |
| EP | 0 862 154 | 9/1998 |
| EP | 1028386 | 8/2000 |
| EP | 1841195 | 11/2000 |
| EP | 1195704 | 4/2002 |
| EP | 1246109 | 10/2002 |
| EP | 1571541 | 3/2005 |
| EP | 1667018 | 10/2005 |
| EP | 2036015 | 12/2007 |
| FR | 2 559 599 | 8/1985 |
| GB | 2 143 662 | 2/1985 |
| GB | 2 203 879 | 10/1988 |
| GB | 2 209 157 | 5/1989 |
| GB | 2 209 158 | 5/1989 |
| GT | 200000127 | 10/2000 |
| GT | 200000061 | 11/2000 |
| GT | 200300100 | 3/2006 |
| GT | 200200141 | 7/2007 |
| IN | 1072/CHENP/2003 | 7/2005 |
| IN | 1763/CHENP/2003 | 3/2007 |
| IN | 2137/CHENP/2005 | 7/2007 |
| IN | 538/MUM/2008 | 4/2008 |
| IN | 8258/DELNP/2007 | 4/2008 |
| IN | 8266/DELNP/2007 | 7/2008 |
| IN | 303/KOLNP/2008 | 12/2008 |
| IN | 53/KOL/2008 | 4/2009 |
| IN | 1421/KOLNP/2009 | 6/2009 |
| JP | 02-139698 | 5/1990 |
| JP | 04-347793 | 12/1992 |
| JP | 05-178422 | 7/1993 |
| JP | 05-342482 | 12/1993 |
| JP | 08-124033 | 5/1996 |
| JP | 10-188141 | 7/1998 |
| JP | 10-340301 | 12/1998 |
| JP | 11-066176 | 3/1999 |
| JP | 11-143954 | 5/1999 |
| JP | 2000-123078 | 4/2000 |
| JP | 2002-279090 | 9/2002 |
| JP | 2002-133080 | 10/2002 |
| JP | 2003-316871 | 11/2003 |
| JP | 2005-141374 | 6/2005 |
| JP | 2005-234981 | 9/2005 |
| JP | 2007-226516 | 9/2007 |
| JP | 2007-257561 | 10/2007 |
| JP | 2008-197768 | 8/2008 |
| JP | 2009-032171 | 2/2009 |
| MX | 218248 | 3/1998 |
| MX | PA/a/2000/002497 | 3/1999 |
| MX | 221246 | 7/1999 |
| MX | PA/a/2002/000636 | 11/2001 |
| MX | MX/a/2007/014520 | 11/2006 |
| WO | 87/00948 | 2/1987 |
| WO | 88/02524 | 4/1988 |
| WO | 88/06771 | 9/1988 |
| WO | 89/09460 | 10/1989 |
| WO | 9100023 | 1/1991 |
| WO | 92/01273 | 1/1992 |
| WO | 9600019 | 1/1996 |
| WO | 9800129 | 1/1998 |
| WO | 99/33016 | 7/1999 |
| WO | 0000045 | 1/2000 |
| WO | 0000145 | 1/2000 |
| WO | 03001513 | 1/2003 |
| WO | 03001514 | 1/2003 |

OTHER PUBLICATIONS

"No more scamming Super Mario," Automatic I.D. News, vol. 12, p. 15, Sep. 1996, 3 pages.

"Software Maker Promises Many Happy Returns", Drug Topics, vol. 140, No. 5, pp. 124-128 (Mar. 4, 1996).

Jan. 6, 2005 Blog (Message 4 of 17) about Schuman article"Bar-Code Scam at Wal-Mart: A Matter of Priorities".

Jan. 13, 2005 Blog (Message 14 of 17) about Schuman article"Bar-Code Scam at Wal-Mart: A Matter of Priorities".

1992 Nintendo Product Returns Policy.

1994 Nintendo Product Returns Policies and Procedures.

1995 Nintendo Product Returns Policies and Procedures.

1996 Nintendo Product Returns Policies and Procedures, 4 pages.

Amazon.com Returns Policy, Our Return Policy is Simple, Jun. 20, 2000, Amazon.com, www.amazon.com/exec/obidos/subst/help/returns-policy.html, pp. 1-2.

Automotive News, "Reynolds, ADP differ on superhighway progress", Crain Communications, Inc., Apr. 11, 1994, 3 pages.

Brewin et al., "Follow That Package!", Computer World, vol. 35, No. 12, Mar. 19, 2001, 4 pages.

Business Wire, "Aztech Labs Inc. is Chosen as Business Depot's 'Vendor of the Year'; Canadian Company Honors Multimedia Hardware Manufacturer as Number One in Computer Category", Business Wire, Inc., May 6, 1996, 2 pages.

Business Wire, "DataTrend receives award from AT&T Global Information Solutions", Business Wire, Inc., Nov. 7, 1995, 2 pages.

Business Wire, "Multimillion-dollar Health-care Products", Business Wire, Inc., Dec. 15, 1993, 2 pages.

Canadian Search Report for CA Patent Application No. 2,350,551, dated Jan. 21, 2004.

CollegeTerm Papers web page printout, "History of Fed Ex", www.collegetermpaper...rmPapers/Aviation/history_of_fed_ex.html (Aug. 24, 2001), 7 pages.

Computer Reseller News, "Case Study; Tapping the Channel's 'Best in Class' ", CMP Publications, Inc., Jan. 30, 1995, 2 pages.

Deposition of Peter J. Junger, vol. 1 & 2 (Nov. 8-9, 2001) and Exhibits 1-4 & 8-19.

Deposition of Philip M. Rogers (Nov. 7, 2001) and Exhibits 1-19.

Dilger, "The other direction," Manufacturing Systems, v. 15, n. 10, pp. 12-13, Oct. 1997, 2 pages.

Direct Return 2000, Software Overview, http://www.directreturn.com/software_overview.htm, Copyright © 2000 Pharmacy Software Solutions, Inc.

Discount Store News, "New Policy System can Pare Suspect Returns, Cut Losses", Discount Store News, Lebhar-Friedman Inc., Jan. 1, 1996, 2 pages.

Dowlin, Kenneth E., "MAGGIE III: The Prototypical Library System", Library Hi Tech, Issue 16, vol. 4, No. 4, Winter 1986, pp. 7-15 (ON 001960-ON 001970).

Dranov, Paula, Automated Library Circulation Systems, 1977-78, pp. 24-47 (ON 001905-ON 001929).

Dreamcom web page printout, www.dreamcomdirect.com/RMA.htm (May 25, 1997).

Emigh, Jacqueline, "Item-Level RFID Is Years Away for Retailers", eWeek, Jan. 5, 2005.

(56) References Cited

OTHER PUBLICATIONS

Fox Appliance Return Parts Policy, Aug. 5, 2003, www.foxmacon.com, online, pp. 1-3.
Georgianis, Maria, "Computer City Moves to Consolidate Returns", Computer Retail Systems, vol. 6, No. 125, Jan. 22, 1998, 2 pages.
Grace, "ABCD Looks to Adopt EDI Transaction Sets", Computer Reseller News, CMP Publications, Inc., Jun. 28, 1993, 2 pages.
Grace, "Reseller Profile—Reynolds and Reynolds; Reynolds goes extra mile—Evolving solutions continue to fuel clients' capabilities", Computer Reseller News, CMP Publications, Inc., Feb. 21, 1994, 2 pages.
Grotta, "Return to vendor: the right way to make mail-order returns", PC Sources, Information Access Company, a Thomson Corporation Company, ASAP Coastal Associates Publishing L.P., Feb. 1992, 10 pages.
Heller, "High cost of returns prompts industry cooperation," Discount Store News, Oct. 1998, 3 pages.
Hoadley, Irene Braden and A. Robert Thorson, An Automated On-Line Circulation System: Evaluation, Development, Use, 1973, 19 pp. (ON 001930-ON 001948).
Hughes Network Systems, LLC, "HughesNet Terms & Conditions", http://www.nationwidesatellite.com/HughesNet/service/HughesNet_terms.asp, available online Sep. 2, 2008.
IBM Systems Journal, vol. 14, No. 1, 1975, pp. 1-101.
Information Disclosure Statement filed in U.S. Appl. No. 08/725,259, filed Oct. 5, 1998.
Information Disclosure Statement filed in U.S. Appl. No. 09/065,552, filed Jul. 19, 1999.
Information Disclosure Statement filed in U.S. Appl. No. 09/362,187, filed Oct. 26, 2001.
Information Disclosure Statement filed in U.S. Appl. No. 09/494,540, filed Jan. 31, 2000.
Information Disclosure Statement filed in U.S. Appl. No. 09/509,021, filed Oct. 26, 2001.
Information Disclosure Statement filed in U.S. Appl. No. 09/809,072, filed Oct. 26, 2001.
Jiji Press Ticker Service, "JCCI Issues Booklet to Explain Distribution", JiJi Press Ltd., Jul. 20, 1989, 1 page.
Jiji Press Ticker Service, "MITI Working Out Business Practice Guidelines", JiJi Press Ltd., Apr. 20, 1990, 1 page.
Joachim, "FedEx Delivers on CEO's IT Vision", InternetWeek, Oct. 25, 1999, 4 pages.
LaPlante, "Rugby Darby; From proprietary host to a distributed LAN-based architecture in 2 years", InfoWorld, InfoWorld Media Group, Nov. 15, 1993, 4 pages.
Leyden, "Burgled mum finds stolen iPod on eBay," The Register, May 17, 2005, 1 page.
Longwell, "Robec Links Its 18 Sales Facilities Via Newly Adopted NetWare System", Computer Reseller News, Sep. 6, 1993.
Longwell, "Western Digital Wins—Price/performance gives driver maker victory margin", Computer Reseller News, CMP Publications, Inc., Jun. 28, 1993, 3 pages.
Margulis, "Reclaim: an efficient way to handle damaged products", U.S. Distribution Journal, BMT Publications Inc., Mar. 15, 1992, 7 pages.

Matthews, Joseph R., "Graphical User Interfaces GUI in Library Products", Library Technology Reports, vol. 32, No. 1, Jan. 1996, p. 53 (ON 001972-ON 001976).
Meyer, James, "NOTIS: The System and Its Features", Library Hi Tech, Issue 10, vol. 3, No. 2, 1985, pp. 81-89 (ON 001949-ON 001959).
Narda News, "Retailing in Cyberspace", Apr. 1995, pp. 21-22.
PR Newswire, "CompuServe Introduces Electronic Product Registration Software", PR Newswire Association, Inc., Mar. 10, 1994, 2 pages.
PR Newswire, "Escada Offers a Garden Variety for Spring", PR Newswire Association, Inc., Mar. 10, 1994, 2 pages.
Quinn, "Why Wang took the third-party route", Information Access Company, a Thomson Corporation Company, ASAP Reed Publishing USA, vol. 30, No. 2, p. 30, Feb. 1991.
Rigney, "User Migrates to Windows NT", InternetWeek, CMP Publications, Inc., Jan. 10, 1994, 2 pages.
Rogers et al., "Going Backwards: Reverse Logistics Trends and Practices", Reverse Logistics Executive Council, 1998 (entire book).
Rosenbloom, "Midnight Express", Inc., Jul. 2001, 4 pages.
Saffady, William, "Integrated Library Systems for Microcomputers and Mainframes: A Vendor Study", Library Technology Reports, vol. 30, No. 1, Jan. 1994, p. 5 (ON 001977-ON 002087).
Saffady, William, "Vendors of Integrated Library Systems for Microcomputers and Mainframes: An Industry Report, part 1", Library Techology Reports, vol. 33, No. 3, May 1997, p. 277 (ON 002088-ON 002096).
Saffady, William, "Vendors of Integrated Library Systems for Microcomputers and Mainframes: An Industry Report, part 2", Library Techology Reports, vol. 33, No. 3, May 1997, p. 277 (ON 002097-ON 002138).
Scala, Betsy Video Business, "Distributors seek 30-day returns", v 13, n 3, p. I + Jan. 22, 1993.
Scala, Betsy Video Business, "Distributors seek 30-day returns", v 15, n 39, p. I + Oct. 6, 1995.
Schuman, Evan,"Bar-Code Scam at Wal-Mart: A Matter of Priorities", eWeek, Jan. 5, 2005.
Schuman, Evan,"Wal-Mart Stung in $1.5 Million Bar-Code Scam", eWeek, Jan. 5, 2005.
Sigafoos et al., "Absolutely Positively Overnight!: The Unofficial Corporate History of Federal Express", St. Luke Press, 1988, pp. 1-22.
Sleeper, "FedEx Pushes the Right Buttons to Remain No. 1 in Fast Shipping", Investor's Business Daily, May 25, 2001, 2 pages.
Synchronics® User Manual: Inventory Plus, Version 6.5, Apr. 1993 (ON 004464-ON 005116).
Synchronics® User Manual: Point of Sale, Version 6.5, Apr. 1993 (ON 005117-ON 005892).
White, Howard S., Library Technology Reports, Mar.-Apr. 1982, vol. 18,No. 2, pp. 178-184 (ON 001851-ON 001858).
Witt, "How to Master the Art of Returns: Automation Is the Key", Material Handling Engineering, Jun. 1994, pp. 58-60.
Witt et al., "Distribution: a differentiator in 2000", Material Handling Engineering, Penton Publishing Inc., Oct. 1995, 15 pages.

SYSTEMS AND/OR METHODS FOR PAGING CONTROL INCLUDING SELECTIVE PAGING ELEMENT DISPLAY ACCORDING TO A BINARY SUBDIVISION AND/OR A SERIAL PROGRESSIVE DISPLAY APPROACH

CROSS REFERENCE TO RELATED APPLICATION

This application is a continuation of Ser. No. 12/585,321 filed Sep. 11, 2009, which claims the benefit of U.S. Application Ser. No. 61/202,768 filed on Apr. 2, 2009, the entire contents of which is hereby incorporated herein by reference in this application.

TECHNICAL FIELD

The exemplary embodiments disclosed herein relate to paging control systems and/or methods that help users navigate through large or small datasets and, more particularly, the exemplary embodiments disclosed herein relate to paging systems and methods that help users navigate through large or small datasets by providing paging control elements according to either a binary subdivision approach or a serial progressive approach. Paging control elements are displayed according to either the binary subdivision approach or the serial progressive approach in dependence on a determination as to which approach is more advantageous based at least in part on factors such as, for example, total number of pages, current page location, distance to end points, screen size, etc.

BACKGROUND AND SUMMARY

Many known paging control systems and methods are suitable for datasets with a small number of elements. One basic example involves providing "next" and "back" navigation elements. This basic example has been improved upon by adding "jump to end" and "jump to beginning" navigation elements. Another known variation involves initially displaying a short list of sequentially ordered numbers corresponding to pages adjacent to a currently selected page. Oftentimes, the selected page is highlighted or otherwise emphasized. Frequently, only a small number of pages are shown at a time. For example, sometimes only 3, 5, or 10 elements are shown. When a user is "in the middle" of a large number of pages, the presence of ellipses (i.e., ". . . ") may indicate the existence of pages on either side of the currently selected page. For example, when there are 10 total pages, the currently selected page is 1, and up to 2 navigation elements are shown on either side of the currently selected page, the following paging control elements may be displayed:

1, 2, 3, . . .

Following the same example, when the user navigates to page 5 (i.e., making the currently selected page 5), the following paging control elements may be displayed:

. . . 3, 4, 5, 6, 7 . . .

As indicated above, "jump to end" and "jump to beginning" navigation elements may be added to these displays, as appropriate. That is, in the former example, a "jump to end" navigation element would be appropriate, whereas a "jump to beginning" navigation element would not be appropriate because the user is already at the first page. In the latter example, both "jump to end" and "jump to beginning" navigation elements may be displayed, since the user is in the "middle" of the pages.

As can be seen from the above, there are a number of paging control techniques than can be successfully implemented, particularly with respect to small datasets. Unfortunately, there also is a need to efficiently and effectively visualize and navigate among more and more elements. This need may be becoming increasingly important as more and more options are presented to users, more data becomes available for research and/or searching, etc. Indeed, this need has manifested itself in many areas of computer-related technologies. For example, researchers may need to navigate among large and complex datasets, online shoppers may need to navigate among a potentially large number of products of interests, searchers may need to traverse large numbers of web pages or other search results when looking for an item of interest, etc. Currently, there is a lack of display techniques oriented towards visualizing and navigating among large datasets, thus making it difficult for users to process them.

Moreover, although the techniques described above are suitable for small datasets, they often are cumbersome or even unmanageable in connection with large datasets. For example, it is easy to see how the above described example paging elements would be extremely difficult to use in connection with datasets of over as few as 50, 100, or even 1,000 total elements. However, it will be appreciated that many searches may return a number of results well over these example amounts. Indeed, an electronic product registration system that manages several million entries cannot be suitably navigated using these conventional controls.

To complicate matters, the need to navigate among large numbers of elements often is tempered by the need to simultaneously provide for visualization and/or navigation among small numbers elements. In other words, not every dataset a researcher is interested in will have millions of records, would-be consumers might find only a small number of products that meet their criteria, search results may be few rather than many, etc. Consequently, it is difficult to create a product that is flexible enough to accommodate both small and large datasets, as (1) small dataset paging control techniques are not well-suited for large dataset paging control techniques, and (2) there currently is a dearth of large dataset paging control techniques available. Even if there were large dataset paging control techniques that could be applied to small datasets, it is likely that they would suffer from a problem similar to that described above in that they would not work well for such sets.

Thus, it will be appreciated that it would be advantageous to provide flexible paging control systems and methods. In other words, it would be advantageous to provide flexible paging control systems and methods that are capable of aiding in user visualization and navigation among datasets of large and small numbers of elements.

One aspect of certain exemplary embodiments relates to paging systems and methods that help users navigate through large or small datasets by providing paging control elements.

Another aspect of certain exemplary embodiments relates to paging systems and methods that provide paging control elements according to either a binary subdivision approach or a serial progressive approach.

Still another aspect of certain exemplary embodiments relates to displaying paging control elements according to either the binary subdivision approach or the serial progressive approach in dependence on a determination as to which approach is more advantageous based at least in part on factors such as, for example, total number of pages, current page location, distance to end points, screen size, etc.

In certain exemplary embodiments, a paging control method enabling a user to navigate through a plurality of data elements displayed on a display of a computer of the user is provided. A subset of the plurality of data elements is displayable in each of a plurality of pages, with the plurality of pages including at least a first page and a last page. Paging control elements are designated for the first and last pages. Information identifying a currently selected page is received. When the currently selected page is either the first page or the last page: it is determined whether additional paging control elements are to be displayed according to either a serial progressive approach or a binary subdivision approach, and additional paging control elements are designated for display between the paging control elements for the first and last pages in accordance with the approach selected in the determining. When the currently selected page is between the first and last pages: it is determined for a first sub-range corresponding to a range between the first page and the currently selected page, whether additional paging control elements are to be displayed according to either a serial progressive approach or a binary subdivision approach; it is determined for a second sub-range corresponding to a range between the currently selected page and the last page, whether additional paging control elements are to be displayed according to either a serial progressive approach or a binary subdivision approach; and additional paging control elements are designated for display between the paging control elements for the first and last pages in accordance with the approaches selected for the first and second sub-ranges in the determining. The currently selected page is formatted for display on the display of the user such that it includes all designated paging control elements.

In certain exemplary embodiments, a computer-readable storage medium comprising a paging control program for enabling a user to navigate through a plurality of data elements may be provided, wherein the program, when executed by the computer performs instructions corresponding to this and/or other methods.

Similarly, in certain exemplary embodiments, a corresponding data visualization system may be provided, with the system comprising a computer having a display and paging control programmed logic circuitry capable of acting similar to the above-described and/or other methods. In such exemplary embodiments, for example, the paging control programmed logic circuitry may be further configured to re-format the currently selected page upon a user selecting a new page to be the currently selected page.

BRIEF DESCRIPTION OF THE DRAWINGS

These and other features, aspects, and advantages will be better and more completely understood by reference to the following detailed description of exemplary illustrative embodiments in conjunction with the drawings, of which:

FIG. 4 is a paging control in an illustrative example where there are 1000 total items, 10 items displayed per page, and the current page is page 1, in accordance with an exemplary embodiment;

FIG. 5 is a paging control that includes the illustrative example conditions of FIG. 4, except that the current page is page 51, in accordance with an exemplary embodiment;

FIG. 6 is a paging control that includes the illustrative example conditions of FIG. 4, except that the current page is page 25, in accordance with an exemplary embodiment;

FIG. 7 is a paging control that includes the illustrative example conditions of FIG. 4, except that the current page is page 12, in accordance with an exemplary embodiment;

FIG. 8 is a paging control that includes the illustrative example conditions of FIG. 4, except that the current page is page 13, in accordance with an exemplary embodiment;

FIG. 9 is a paging control that includes the illustrative example conditions of FIG. 4, except that the current page is page 100, in accordance with an exemplary embodiment;

FIG. 10 is a paging control in an illustrative example where there are 10000 total items, 10 items displayed per page, and the current page is page 1, in accordance with an exemplary embodiment.

DETAILED DESCRIPTION

Certain exemplary embodiments relate to paging control systems and methods that continuously or substantially continuously regenerate the control user interface at each user-interactive step towards a target page by re-determining the mid-point interactive elements using binary subdivision and then switching to serial progressive mid-point elements when the distance between the current step and the appropriate endpoint of the dataset determines the binary subdivision approach to be less advantageous than the serial progressive approach. More particularly, certain exemplary embodiments relate to a technique that includes a paging control that at each progressive interaction step towards a target page dynamically generates updated user interface elements so as to provide for rapid navigation to a target page—regardless of how extensive or small the range of pages in the dataset. The control implementation of certain exemplary embodiments reduces the number of user interface elements dynamically based on the range, thus reducing the number of interaction elements when they are expected to provide little or no additional value to the user.

A paging control technique according to certain exemplary embodiments provides an improved approach for providing interactive mid-point user interface page navigation elements. The control implementation uses a page target approach model that leverages two alternative approaches to dynamically creating user interface elements. The result is a control that provides a space-wise efficient intuitive user interface for navigating through both large and small datasets. The technique used to determine which and how many interactive elements to display makes use of multiple input criteria to determine what user interface elements to provide to the user for any given dataset size and the currently viewed position within that dataset. That is, for any given current position within the dataset, the paging control technique of certain exemplary embodiments splits the dataset into two ranges: beginning to current page, and current page to end. Up to a predetermined number of iterations of binary subdivision (e.g., 5, 6, 7, etc. iterations) are then used to calculate what mid-point user interaction elements to render for the user between the current position and either endpoint. When the binary split approach is determined to be the best approach for any given range; to keep the interaction elements to an efficient number (e.g., based on the rendering area provided), only the inner mid-points between the current page and the particular endpoint are rendered. When the serial progression approach is used, all intermediate mid-points (pages) between the current position and the endpoint are rendered as interaction elements.

Figure 1:
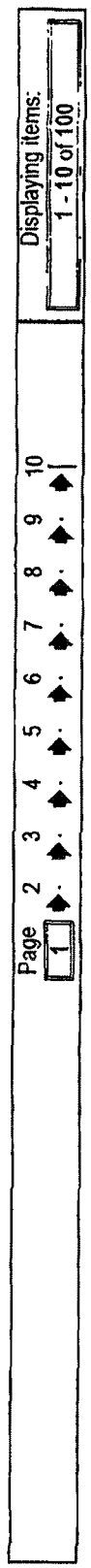
FIG. 1 is a paging control in an illustrative example where there are 100 total items, 10 items displayed per page, and the current page is page 1, in accordance with an exemplary embodiment.

FIGS. 1-10 demonstrate how the paging control techniques of certain exemplary embodiments are implemented. It will be appreciated that zero or negative values for Total Items and Items/Page in the examples are not valid or of value in demonstrating the techniques of certain exemplary embodiments/paging control. In this regard, FIG. 1 is a paging control in an illustrative example where there are 100 total items, 10 items displayed per page, and the current page is page 1, in accordance with an exemplary embodiment. Given these parameters, there are 10 possible pages on which elements can be displayed. The distances from the current page to each of the extremes (the beginning and end pages) are determined. In this example, the current page is the beginning page and there are 8 pages between the currently selected page and the last page.

It is then determined that the serial approach is best suited for this display environment. As explained in greater detail below, this determination can be based on any number of different criteria. In certain exemplary embodiments, the criteria may be as simple as determining whether the total number of pages is less than a predetermined threshold, which may be related to the size of the display area. For example, the display area may be capable of accommodating 5, 10, 12, 15, 25, 27, 30, or some other number of paging control elements. If the number of pages is less than this number, then the serial approach may be used. In this example, because the display area is large enough to accommodate page elements for at least 10 different pages, the serial approach can be used for displaying paging control elements from the currently selected page to the end point. It will be appreciated that no determination need be made for the range between the currently selected page and the beginning page, since the currently selected page in this example is the beginning page. In other words, some checking may be performed to determine whether the current page is either the beginning page or the ending page. If either condition is met, the display approach for that range need not be determined.

In this example, ten different paging control elements are provided. Associated with each paging control element is a page label. Furthermore, the currently selected page is indicated in the white box. Optionally, in certain exemplary embodiments, the number within the white box may be editable so that a user can jump directly to a page of interest, e.g., by entering a page number and initiating the jump (for example, by pressing the enter key on a keyboard, clicking a particular button, etc.) without selecting a separate paging control element.

Although not explicitly shown in FIG. 1, it will be appreciated that the items or elements of interest within the page range may be displayed in the display portion. The element or item numbers may be indicated in an optional display area, along with the total number of elements. Thus, in the FIG. 1 example, because page 1 is selected, there are 10 total pages, and 100 total items, the optional display area indicates that items 1-10 of 100 are displayed.

Figure 2:
FIG. 2 is a paging control that includes the illustrative example conditions of FIG. 1, except that the current page is page 5, in accordance with an exemplary embodiment.

FIG. 2 is a paging control that includes the illustrative example conditions of FIG. 1, except that the current page is page 5, in accordance with an exemplary embodiment. The current page may be set to page 5 by the user selecting the fifth paging element below the page indicator with the label "5." Alternatively, the current page may be set to page 5 after the user designates that the fifth page should be jumped to by inserting the number "5" in the editable current page box in FIG. 1 and pressing an appropriate key. In any event, the current page is now in the middle of the extremes, and paging control elements are provided for pages 1-4 to the left of the current page indicator while paging control elements are provided for pages 6-10 to the right of the current page indicator.

Thus, in certain exemplary embodiments, it is determined for the range between the first page and the current page and the range between the current page and the last page which display approach should be used. In the FIG. 2 example, the serial progressive display approaches are used for both ranges. The determination that the serial progressive display approach should be used for both ranges may be based on the fact that the total number of pages is less than a threshold limit, as described above. Alternatively, the determination that the serial progressive display approach should be used for both ranges may be based on the fact that the individual ranges are less than respective thresholds. In still another possibility, the determination that the serial progressive display approach should be used for both ranges may be based on the fact that a predetermined number of sub-divisions (e.g., at least 5 sub-divisions) cannot be performed for either of the ranges. Other criteria may be used in place of or in combination with any or all of these potential tests in certain exemplary embodiments.

Similar to the above, the element or item numbers may be indicated in an optional display area, along with the total number of elements. Thus, in the FIG. 2 example, because page 5 is selected, there are 10 total pages, and 100 total items, the optional display area indicates that items 41-50 of 100 are displayed.

Figure 3:
FIG. 3 is a paging control that includes the illustrative example conditions of FIG. 1, except that the current page is page 10, in accordance with an exemplary embodiment.

FIG. 3 is a paging control that includes the illustrative example conditions of FIG. 1, except that the current page is page 10, in accordance with an exemplary embodiment. In some respects, FIG. 3 is the "mirror image" of FIG. 1. That is, the currently selected page is the last page (page 10) in the FIG. 3 example, instead of the first page (page 1) in the FIG. 1 example. Just as the serial progressive approach is determined to be the better approach for the display of the navigation elements in FIG. 1, the serial progressive approach also is determined to be the better approach for the display of the navigation elements in FIG. 3.

In view of the above, it will be appreciated that the illustrative conditions that lead to the FIGS. 1-3 examples only used the serial progressive approach. However, when there is a greater amount of data to be displayed and/or a greater number of pages that are displayable, the serial progressive approach may not be appropriate for efficiently and effectively navigating through and/or visualizing the same. In this regard, a further example is presented in connection with FIGS. 4-9 that involve a greater number of elements and pages compared to the example presented in connection with FIGS. 1-3. As will become clearer from the detailed description below, the example is presented in connection with FIGS. 4-9 involves scenarios in which both the serial progressive approach and the binary subdivision approach to displaying paging control elements are implemented.

Figures 4, 5, 6:
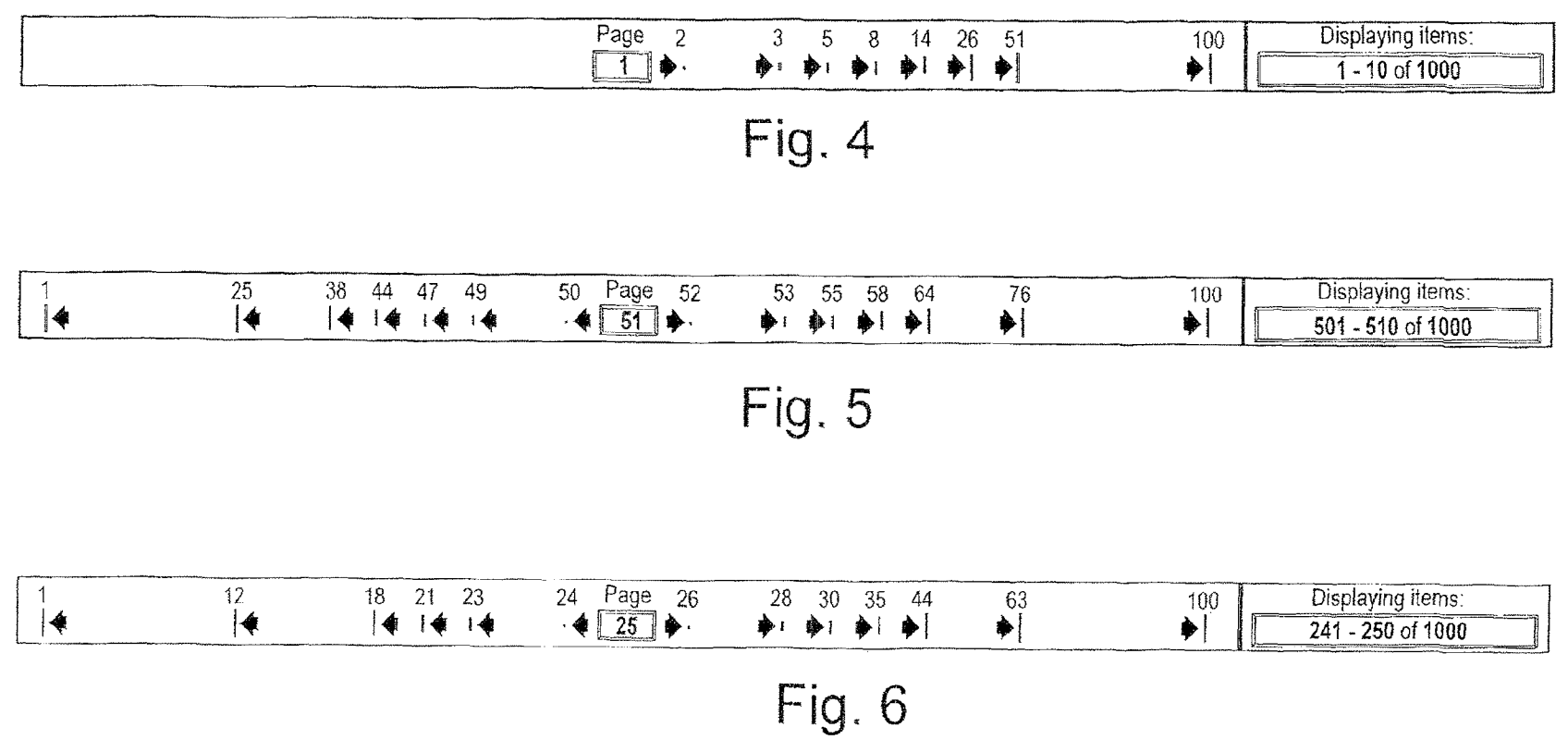

FIG. 4 is a paging control in an illustrative example where there are 1000 total items, 10 items displayed per page, and the current page is page 1, in accordance with an exemplary embodiment. Because the current page is page 1, elements 1-10 of 1000 would be displayed. Given these example parameters, it will be appreciated that the items will be displayed throughout 100 different pages. Thus, if the serial progressive approach were to be used, 100 different paging control elements would be needed. However, it would be appreciated that displaying 100 different paging control elements would be difficult to use, and might not be feasible, given the amount of "real estate" available on the display device. Thus, according to the FIG. 4 example, when the current page is 1, it is determined that the better approach to displaying paging control elements involves the binary subdivision approach.

Because the first page is the currently selected page, the display elements for only one range (from beginning to end) needs to be displayed. In certain exemplary embodiments, when the binary subdivision approach is implemented, the "next" and "last" elements may be automatically displayed. In this example, the "next" element would be an element for navigating to page 2. The last element in the range would be an element for navigating to page 100. This sub-range may be divided to determine the first intermediate point to display. In this example, adding the lowest element (2) and the intermediate endpoint element (100) and dividing by 2 results in the first intermediate point to be displayed (51).

To determine the next intermediate point to be displayed, the intermediate endpoint element now may be reset so as to correspond to the first intermediate point (51), and the process may be repeated. In other words, adding the lowest element (2) and the new intermediate endpoint element (51) and dividing by 2 results in the second intermediate point to be displayed. In this example, the result of the calculation, i.e., 26.5, is not a whole number. To arrive at a whole number, a rule for handling non-whole number calculations may be implemented. In certain exemplary embodiments, truncation may be used which in this illustrative example would make the second intermediate point equal to 26. In certain other exemplary embodiments, rounding up or down may be used. Rounding up in this illustrative example would make the second intermediate point equal to 27. The rule for handling non-whole number calculations may be implemented consistently whenever a non-whole number is encountered in certain exemplary embodiments. Alternatively, in certain exemplary embodiments, various rounding rules may be used depending other factors such as, for example, how close the intermediate element would be compared to the next adjacent intermediate element, whether the sub-range is to the left or right of the currently selected page, etc. For example, rounding down may be used when the sub-range is to the right of the currently selected page, whereas rounding up may be used when the sub-range is to the left of the currently selected page—or vice versa. In any event, in the FIG. 4 example, the non-whole number is truncated so that the second intermediate point is equal to 26 and a corresponding paging control element is displayed therefor.

This process may be repeated such that other paging control elements are calculated. In the FIG. 4 example, intermediate further paging control elements are provided for pages 14 ((26+2)/2), 8 ((14+2)/2), 5 ((8+2)/2), and 3 (the truncated result of (5+2)/2). The paging control element for page 3 may stop the process, since it is directly adjacent to the lowest added element (2). In other words, in certain exemplary embodiments, the binary subdivision approach may be used to repeatedly determine intermediate paging control elements until a paging control element that is directly adjacent to the lowest added element is found, thereby indicating that there are no additional whole numbers between the two. In certain exemplary embodiments, the same and/or different events may trigger the end of the binary subdivision. For example, in certain exemplary embodiments, a maximum number of binary subdivisions may be set, and additional binary subdivisions (e.g., 5, 6, 7, 10, etc.) may not be performed beyond this threshold. This threshold may be predetermined, for example, based on screen size, or other factors.

FIG. 5 is a paging control that includes the illustrative example conditions of FIG. 4, except that the current page is page 51, in accordance with an exemplary embodiment. Because the current page is page 51, elements 501-510 of 1000 would be displayed. Additionally, because the current page is page 51 and thus is between the extreme first point (page 1) and end point (page 100), paging control elements may be provided for the ranges the left and right of the current page element (51). As above, if the serial progressive approach were to be used, 100 different paging control elements would be needed, with 50 being provided to the left of the currently selected page element and 49 being provided to the right of the currently selected page element. Thus, it is determined that the binary subdivision approach would be better suited for both the left and right sub-ranges. A description of how the paging elements for these sub-ranges are displayed follows.

First, with respect to the sub-range to the right of the currently selected page element, the "next" element would be an element for navigating to page 52. The last element in the range would be an element for navigating to page 100. Similar to the description above, intermediate points may be calculated. In the FIG. 5 example, the intermediate paging control elements include 76 ((100+52)/2), 64 ((76+52)/2), 58 ((64+52)/2), 55 ((58+52)/2), and 53 (the truncated result of (55+52)/2). Because the number 53 is directly adjacent to 52, the binary subdivision stops.

Second, with respect to the sub-range to the left of the currently selected page element, the "previous" (as opposed to the "next") element would be an element for navigating to page 50. Similar to the description above, intermediate points may be calculated. The first intermediate paging control element will equal the difference between the "previous" element (50) and the first element (1), divided by 2. Because 24.5 is not a whole number, a nearest whole number may be used instead. In the FIG. 5 example, the number is rounded up so that it is closer to the currently selected page. Accordingly, in this example, the first intermediate point thus is 25.

To determine the next intermediate point to be displayed, the intermediate endpoint element now may be reset so as to correspond to the first intermediate point (25), and the process may be repeated. In other words, adding the previous element (50) and the new intermediate endpoint element (25) and then dividing by 2 results in the second intermediate point to be displayed. Again, because 37.5 is not a whole number, it may be rounded up, thus resulting in the second intermediate of 38. This process is repeated so that further intermediate points are calculated. In the FIG. 5 example, these intermediate points include 44 ((38+50)/2), 47 ((44+50)/2), and 49 (the rounded-up result of (47+50)/2). Because the number 49 is directly adjacent to 50, the binary subdivision stops.

FIG. 6 is a paging control that includes the illustrative example conditions of FIG. 4, except that the current page is page 25, in accordance with an exemplary embodiment. In other words, the FIG. 6 example may be displayed when a user "jumps" to the twenty-fifth page by selecting the appropriate link in the FIG. 5 example. Because page 25 is displayed in FIG. 6, items 241-250 of 1000 would be displayed.

In the FIG. 6 example, it is determined that both the left and right sub-ranges would be better suited to the binary subdivision approach. Accordingly, in addition to displaying the currently selected page (25) along with the first (1), last (100), "next" (26), and "previous" (24) paging control elements, the binary subdivision approach is used to display the other paging control elements in the two sub-ranges. In the right sub-range, elements 63 ((26+100)/2), 44 (the truncated result of (26+63)/2), 35 ((26+44)/2), 30 (the truncated result of (26+35)/2), and 28 ((26+30)/2) are displayed. In the left sub-range, elements 12 (the rounded-up result of (24+1)/2), 18 ((24+12)/2), 21 ((24+18)/2), and 23 (the rounded-up result of (24+21)/2) are displayed.

Figures 7, 8, 9, 10:
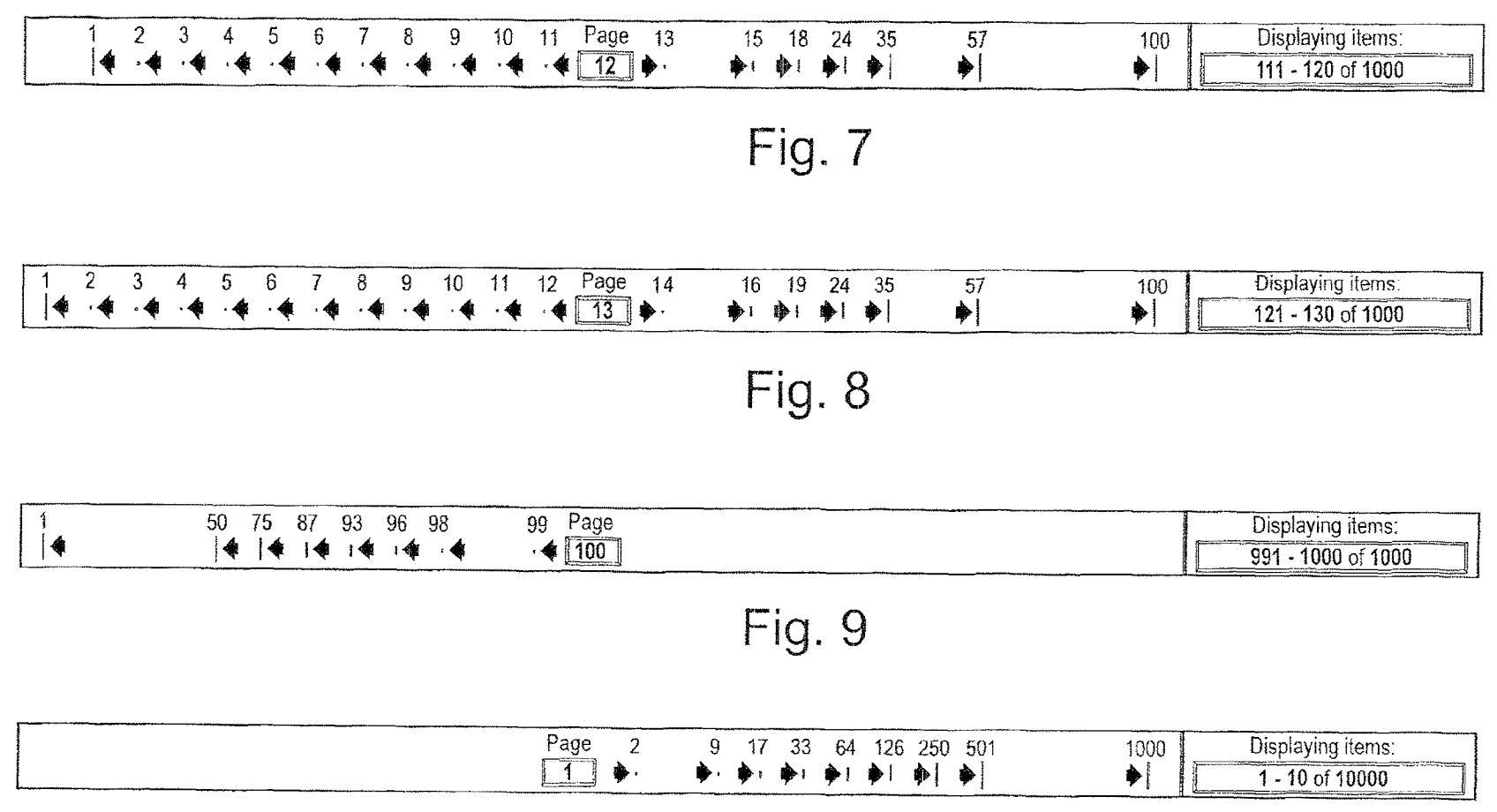

FIG. 7 is a paging control that includes the illustrative example conditions of FIG. 4, except that the current page is page 12, in accordance with an exemplary embodiment. In other words, the FIG. 7 example may be displayed when a user "jumps" to the twelfth page by selecting the appropriate link in the FIG. 6 example. Because page 12 is displayed in FIG. 7, items 111-120 of 1000 would be displayed.

Unlike the examples in FIGS. 4-6, it is determined that the left sub-range should be displayed according to the serial progressive approach, while the right sub-range should be displayed according to the binary subdivision approach. This may be determined, for example, by noting that the currently selected page is within a predefined distance of either the start point or end point. In certain exemplary embodiments, one or more points may be setup such that when a user navigates to or past such a point, the display approach is changed, e.g., from the binary subdivision approach to the serial progressive approach, or vice versa. In certain exemplary embodiments, the points may be pre-defined, e.g., based at least in part on the size of the screen (e.g., such that no more than 10, 11, 12, 13, etc., paging control elements can be displayed according to the serial progressive approach). In certain exemplary embodiments, the serial progressive approach may be used if a predefined number of binary subdivisions cannot be performed (e.g., the serial progressive approach may be used if 3, 4, 5, etc., subdivisions cannot be made for a range or sub-range without there being redundant numbers).

In any event, returning to FIG. 7, as indicated above, the serial progressive approach is determined to be better for the left sub-range. Accordingly, paging control elements from the first page (1) to the "previous" page (11) are provided. In contrast, the binary subdivision approach is determined to be better for the right sub-range. Thus, paging control elements are provided for pages 13 (the next page), 15, 18, 24, 35, and 57, and 100 (the last page).

As can be seen in the FIG. 7 example, different paging control element images may be used in accordance with the approach selected. For example, when the serial progressive approach is selected, identical images are used, suggesting to the user that the "jumps" are the same. In the FIG. 7 example, the icon for the elements displayed according to the serial progressive approach is an arrow with a small dot next to it. By contrast, different images may be used for the binary subdivision approach, e.g., so as to help signify that bigger "jumps" are being taken and also to help signify the scale of such "jumps." Accordingly, the elements displayed according to the binary subdivision approach are shown as small blocks that get larger as the distance from the currently selected page increases. Separate icons for the first and last pages are provided. Of course, it will be appreciated that these and/or other images may be used for the paging control elements in certain exemplary embodiments. Indeed, certain exemplary embodiments of this invention need not use different paging control elements depending upon the selected approach. In a similar regard, the area around the currently selected page need not be a "box," and it may or may not be a user-editable field.

FIG. 8 is similar to FIG. 7, in that FIG. 8 is a paging control that includes the illustrative example conditions of FIG. 4, except that the current page is page 13, in accordance with an exemplary embodiment. In the FIG. 8 example, the serial progressive approach is still used for the left sub-range, and the binary subdivision approach is still used for the right sub-range. Thus, paging control elements are provided for pages 14 (the next page), 16, 19, 24, 35, 57, and 100 for the right sub-range.

The inventor of the instant application has determined that it may be advantageous to display the following maximum number of paging control elements according to the serial progressive approach in certain exemplary embodiments that are capable of displaying 27 separate points across. The number of elements includes the "current" and either the "last" or "first" paging elements.

| Total Number of Pages | Max. Number of Elements |
| --- | --- |
| >192 | 13 |
| 96-192 | 12 |
| 48-95 | 11 |
| 25-47 | 10 |
| <25 | 10 |

Of course, it will be appreciated that other maximum number of elements may be defined for use in different exemplary embodiments of this invention, and this is merely one example of how the maximum number of serial progressive points may be setup in one exemplary embodiment.

FIG. 9 is a paging control that includes the illustrative example conditions of FIG. 4, except that the current page is page 100, in accordance with an exemplary embodiment. Thus, similar to FIG. 3 described above, only one range is displayed. However, unlike the FIG. 3 example, because the difference between the first page and current page (which is in this case the last page) is great, the binary subdivision approach is used to display paging control elements for pages 1, 50, 75, 87, 93, 98, and 99.

As alluded to above, the number of binary subdivisions to be performed may be capped in certain exemplary embodiments. For example, depending on the size of the dataset, more or fewer binary subdivisions may be advantageous. For example, even though it would be possible to perform at least one further binary subdivision for the right sub-range of FIG. 8, only five subdivisions are provided. Of course, this number could be varied to a greater number (e.g., six) or a lesser number (e.g., 4, 3, 2, 1, etc.), depending on the exemplary embodiment.

The inventor of the instant application has determined that the following switch points are advantageous in certain exemplary embodiments that are capable of displaying 27 separate points across. The number of subdivisions does not include the "next" and either "last" or "first" paging elements.

| Total Number of Pages | Number of Subdivisions |
| --- | --- |
| >192 | 7 |
| 97-192 | 6 |
| 49-96 | 5 |
| 25-48 | 4 |
| <25 | 3 |

Of course, it will be appreciated that other switch points may be used in different exemplary embodiments of this invention, and this is merely one example of how such switch points may be setup in one exemplary embodiment.

FIG. 10 is a paging control in an illustrative example where there are 10000 total items, 10 items displayed per page, and the current page is page 1, in accordance with an exemplary embodiment. Thus, it will be appreciated that there are a large number of pages through which a user might navigate. The binary subdivision approach would be better suited for this example. Additionally, because the FIG. 10 example has a large number of pages, many binary subdivisions are possible. However, in accordance with the description provided above, only seven subdivisions may be performed such that nine paging elements to the right of the currently selected page are provided, e.g., to aid in user navigation and/or visualization of the dataset. Indeed, too many navigation buttons may be troublesome for the user, even when the binary subdivision approach is used.

Although the foregoing example have included information pertaining to number of elements, number of elements to be displayed per page, current pages, switch points, maximum number of elements to display according to the serial progressive approach, maximum number of elements to be displayed on a page, etc., it will be appreciated that these parameters have been provided by way of example and without limitation. Other parameters may be predefined for a user in certain exemplary embodiments. Alternatively, some or all of the foregoing and/or other elements may be user-definable in certain exemplary embodiments.

Figure 11:
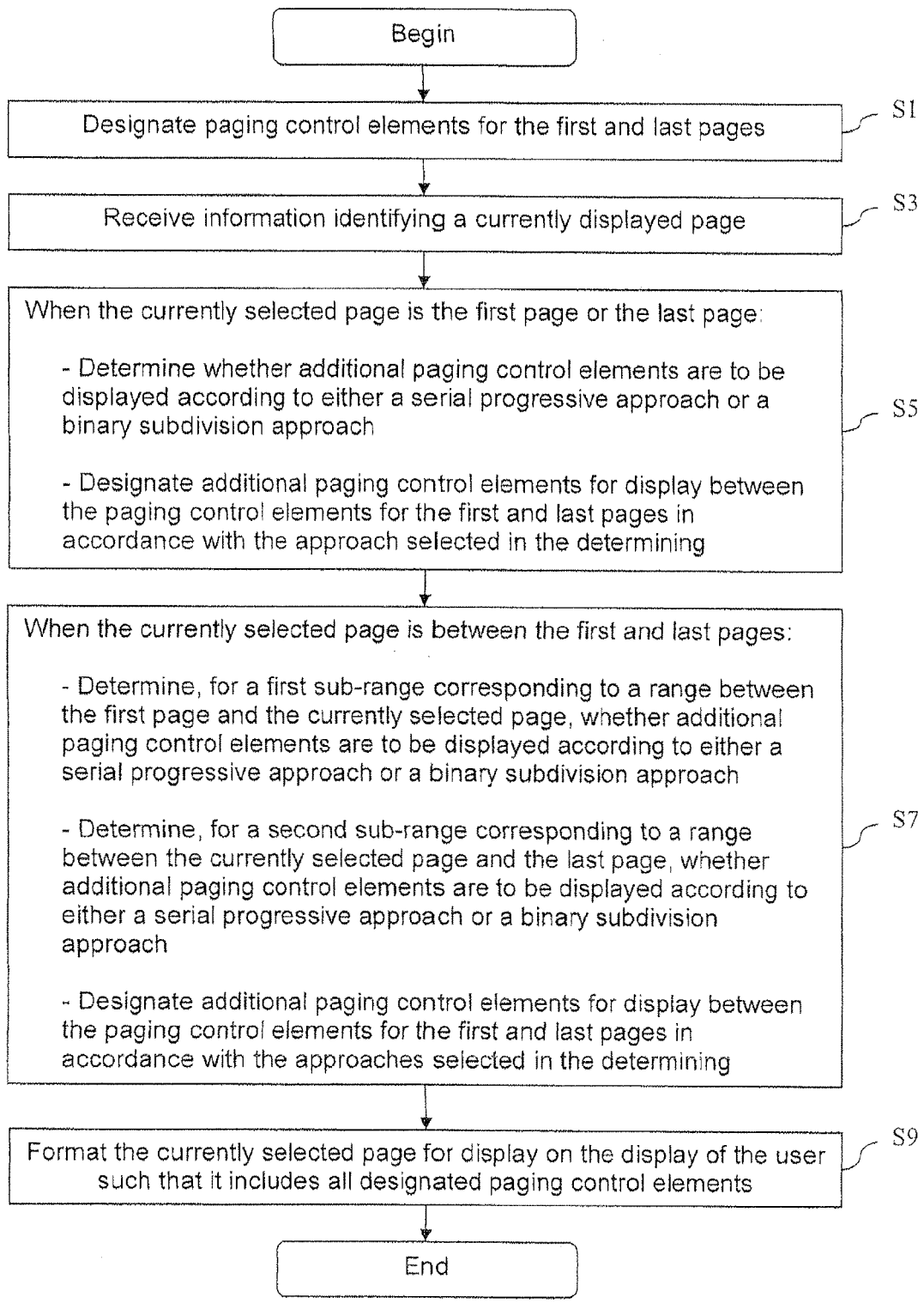
FIG. 11 is a flowchart illustrating an illustrative process for displaying paging control elements in accordance with an exemplary embodiment.

FIG. 11 is a flowchart illustrating an illustrative process for displaying paging control elements in accordance with an exemplary embodiment. In other words, FIG. 11 is an example paging control method enabling a user to navigate through a plurality of data elements displayed on a display of a computer of the user. A subset of the plurality of data elements may be displayable in each of a plurality of pages, and the plurality of pages may include at least a first page and a last page. Paging control elements for the first and last pages are designated in step S1. Information identifying a currently selected page is received in step S3.

In step S5, when the currently selected page is either the first page or the last page, it is determined whether additional paging control elements are to be displayed according to either a serial progressive approach or a binary subdivision approach. Additional paging control elements also are designated for display between the paging control elements for the first and last pages in accordance with the approach selected in the determining.

Similarly, in step S7, when the currently selected page is between the first and last pages, it is determined for a first sub-range corresponding to a range between the first page and the currently selected page whether additional paging control elements are to be displayed according to either a serial progressive approach or a binary subdivision approach, and it is determined for a second sub-range corresponding to a range between the currently selected page and the last page whether additional paging control elements are to be displayed according to either a serial progressive approach or a binary subdivision approach. Additional paging control elements also are designated for display between the paging control elements for the first and last pages in accordance with the approaches selected for the first and second sub-ranges in the determining.

In step S9, the currently selected page is formatted for display on the display of the user such that it includes all designated paging control elements. As illustrated above, in certain exemplary embodiments, when the currently selected page is either the first page or the last page, the determining may depend on a number of pages between the first page and the last page; and when the currently selected page is between the first and last pages, the determining for the first sub-range depends on a number of pages between the first page and the currently selected page, and the determining for the second sub-range may depend on a number of pages between the currently selected page and the last page.

In one or more steps not shown, data may be retrieved and/or displayed in accordance with the currently selected page. Such data may be retrieved, for example, from a storage location located on or remote from the user's computer, across a network, a database, etc. For example, certain example embodiments may be useful for visualizing data from an electronic registration (ER) database that includes product registration, repair, warranty, policy, and/or other information.

In certain exemplary embodiments, the designating for the serial progressive approach may comprise designating paging control elements for each successive page between start and end pages in a range or sub-range. In certain exemplary embodiments, the designating for the binary subdivision approach may comprise calculating a midpoint page between the start and end pages; setting the end page to the midpoint page; and repeating this process. For example, the process may be repeated no more than a predetermined number of times. In certain exemplary embodiments, the calculating of a midpoint may further comprise rounding to a whole number closest to the currently selected page when the calculating of the midpoint does not result in a whole number.

According to certain exemplary embodiments, the binary subdivision approach may not be selected unless at least three subdivisions are possible. According to certain exemplary embodiments, the serial progressive approach may not be selected if greater than a predetermined number of (e.g., 13) paging control elements would be designated for display.

According to certain exemplary embodiments, when the currently selected page is between the first and last pages, at least one paging element for at least one corresponding page directly adjacent the currently selected page also may be designated.

Of course, it will be appreciated that any or all of the techniques described above may be re-performed upon a user selecting a new page—with the new page being designated as the currently selected page. Although the term "pages" has been used herein, it will be appreciated that the instant invention is not limited to "web pages." For example, any display screen rendered on a computerized display could be considered a "page" according to the usage of the term herein. Furthermore, a "page" according to the usage of the term herein may be only a portion of a larger display. The larger display may or may not change in certain exemplary embodiments, although at least some area of the larger display will be updated (e.g., with new data for the different "page" and/or updated paging control elements) when a currently displayed or currently selected "page" is changed.

Although certain example embodiments have referred to the binary subdivision approach (e.g., where the ½, ¼, ⅛, etc., pages are displayed), it will be appreciated that other subdivision approaches could be used in place of or in addition to this approach. For example, rather than using midpoint, one-third points, one-quarter points, etc., could be used in connection with certain example embodiments.

The features, aspects, advantages, and exemplary embodiments described herein may be combined in various combinations and sub-combinations to realize yet further embodiments of this invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A navigation control method enabling a user to navigate through a plurality of data elements displayed on a display of a computer device, a subset of the plurality of data elements being displayable in each of a plurality of memory pages, the plurality of data containers including at least a first memory page and a different, last memory page, the method comprising:
   (a) designating navigation control elements for the first and last memory pages;
   (b) receiving information identifying a currently selected memory page;
   (c) when the currently selected memory page is either the first memory page or the last memory page:
      determining whether additional navigation control elements are to be displayed according to either a serial progressive approach or a subdivision approach and choosing between these approaches for subsequent display of navigation control elements, and
      designating additional navigation control elements for display between the navigation control elements for the first and last memory pages in accordance with the chosen approach, wherein such designating for the subdivision approach comprises:
         (i) calculating an intermediate point value between the start and end memory pages;
         (ii) generating an intermediate point memory page;
         (iii) labeling the generated intermediate point memory page with the calculated intermediate point value;
         (iv) setting the end memory page to the generated intermediate point memory page; and
         (v) repeating (i)-(iv) until further calculations are not possible because the data containers involved in the calculating are adjacent to one another or until a predetermined number of calculations are performed, whichever comes first;
   (d) when the currently selected memory page is between the first and last memory pages:
      determining, for a first sub-range corresponding to a range between the first memory page and the currently selected memory page, whether additional navigation control elements are to be displayed according to either a serial progressive approach or a subdivision approach and choosing between these approaches for subsequent display of navigation control elements,
      determining, for a second sub-range corresponding to a range between the currently selected memory page and the last memory page, whether additional navigation control elements are to be displayed according to either a serial progressive approach or a subdivision approach and choosing between these approaches for subsequent display of navigation control elements, and
      designating additional navigation control elements for display between the navigation control elements for the first and last memory pages in accordance with the approaches chosen for the first and second sub-ranges; and
   (e) displaying, on the display of the computer device, all designated navigation control elements and the currently selected memory page,
   wherein the subdivision approach, when chosen, at least initially involves partitioning at intervals of 1/n, where n>1.

2. The method of claim 1, wherein:
   when the currently selected memory page is either the first memory page or the last memory page, the determining depends on a number of memory pages between the first memory page and the last memory page; and
   when the currently selected memory page is between the first and last memory pages, the determining for the first sub-range depends on a number of memory pages between the first memory page and the currently selected memory page, and the determining for the second sub-range depends on a number of memory page between the currently selected memory page and the last memory page.

3. The method of claim 1, wherein the designating for the serial progressive approach comprises designating navigation control elements for each successive memory page between start and end memory pages in a range or sub-range.

4. The method of claim 1, wherein (i) further comprises rounding the intermediate point value to a whole number when the calculating of the midpoint does not result in a whole number.

5. The method of claim 1, wherein the subdivision approach is not chosen unless at least three subdivisions are possible.

6. The method of claim 1, wherein the serial progressive approach is not chosen if greater than 13 navigation control elements would be designated for display.

7. The method of claim 1, further comprising designating, when the currently selected memory page is between the first and last memory pages, at least one navigation element for at least one corresponding memory page directly adjacent the currently selected memory page.

8. The method of claim 1, wherein the determining of the approach(es) in (c) and in (d), when practiced, is based at least in part on a total number of displayable memory pages, current memory page location, distance to end point(s), and/or display screen size.

9. The method of claim 1, wherein the serial progressive approach is chosen when a total number of memory pages is less than a predetermined threshold, the predetermined threshold being selected based on a size associated with a display area on the display.

10. The method of claim 1, further comprising repeating (a)-(e) upon a user selecting a new memory page via one of the navigation control elements, the new memory page being designated as the currently selected memory page.

11. The method of claim 10, further comprising, as part of (e) displaying a designated control element configured to enable the user to input a particular memory page of interest and to cause the display to be updated so that that particular memory page is displayed when the designated control element is actuated without having to display intermediate memory pages between the memory page displayed when the input is received and the particular memory page and without having to use any other navigation control elements.

12. A non-transitory computer-readable storage medium comprising a navigation control program for enabling a user to navigate through a plurality of memory pages including different data element subsets in connection with a display of an electronic device, there being at least first and last memory pages, wherein the program, under control of the electronic device, performs instructions for at least:
(a) designating navigation control elements for association with the first and last memory pages;
(b) receiving information identifying a currently selected memory page;
(c) when the currently selected memory page is either the first or the last memory page:
   determining whether additional navigation control elements are to be displayed according to either a serial progressive approach or a subdivision approach and choosing between these approaches for subsequent display of navigation control elements, and
   designating additional navigation control elements for display between the navigation control elements associated with the first and last memory pages in accordance with the approach chosen in the determining, wherein such designating for the subdivision approach comprises:
      (i) calculating an intermediate point value between the start and end memory pages;
      (ii) generating an intermediate point memory page;
      (iii) labeling the generated intermediate point memory page with the calculated intermediate point value;
      (iv) setting the end memory page to the generated intermediate point memory page; and
      (v) repeating (i)-(iv) until further calculations are not possible because the data containers involved in the calculating are adjacent to one another or until a predetermined number of calculations are performed, whichever comes first;
(d) when the currently selected container is between the first and last memory pages:
   determining, for a first sub-range corresponding to a range between the first memory page and the currently selected memory page, whether additional navigation control elements are to be displayed according to either a serial progressive approach or a subdivision approach and choosing between these approaches for subsequent display of navigation control elements,
   determining, for a second sub-range corresponding to a range between the currently selected memory page and the last memory page, whether additional navigation control elements are to be displayed according to either a serial progressive approach or a subdivision approach and choosing between these approaches for subsequent display of navigation control elements, and
   designating additional navigation control elements for display between the navigation control elements for the first and last memory pages in accordance with the approaches chosen for the first and second sub-ranges in the determining; and (e) displaying, on the display of the electronic device, all designated navigation control elements and the currently selected memory page,
wherein the subdivision approach, when chosen, at least initially involves partitioning at regular intervals equal to 1/n, where n>1.

13. The computer-readable storage medium of claim 12, wherein the program is further configured to at least repeat (a)-(e) upon a user selecting a new memory page via one of the navigation control elements, the new memory page being designated as the currently selected memory page.

14. The computer-readable storage medium of claim 13, wherein the program is further configured to, as part of (e), at least display a designated control element configured to enable the user to input a particular memory page of interest and to cause the display to be updated so that that particular memory page is displayed when the designated control element is actuated without having to display intermediate memory pages between the memory page displayed when the input is received and the particular memory page and without having to use any other navigation control elements.

15. The computer-readable storage medium of claim 10, wherein the program is further configured to designate, when the currently selected memory page is between the first and last memory pages, at least one navigation element for at least one corresponding memory page directly adjacent the currently selected memory page.

16. A data visualization system, comprising:
a computer having a display associated therewith; and
paging control program logic configured to enable a user to navigate through a plurality of data elements displayed on the display of the computer of the user, a subset of the plurality of data elements being displayable in each of a plurality of memory pages, the plurality of memory pages including at least a first memory page and a last memory page,
wherein the paging control program logic is further configured to at least: (a)
   designate paging control elements for the first and last memory pages;
(b) receive information identifying a currently selected memory page;
(c) when the currently selected memory page is either the first memory page or the last memory page:
   determine whether additional paging control elements are to be displayed according to either a serial progressive approach or a subdivision approach and choose between these approaches for subsequent display of paging control elements, and
   designate additional paging control elements for display between the paging control elements for the first and last memory pages in accordance with the approach chosen in the determining;
(d) when the currently selected memory page is between the first and last memory pages:
   determine, for a first sub-range corresponding to a range between the first memory page and the currently selected memory page, whether additional paging control elements are to be displayed according to either a serial progressive approach or a subdivision approach and choose between these approaches for subsequent display of paging control elements,
   determine, for a second sub-range corresponding to a range between the currently selected memory page and the last memory page, whether additional paging control elements are to be displayed according to either a serial progressive approach or a subdivision approach and choose between these approaches for subsequent display of paging control elements, and designate additional paging control elements for display between the paging control elements for the first and last memory pages in accordance with the approaches chosen for the first and second sub-ranges in the determining; and (e) format the currently selected memory page for display on the display of the user such that it includes all designated paging control elements, wherein the subdivision approach, when chosen, at least initially involves partitioning at regular intervals equal to 1/n, where n>1 and wherein the subdivision approach is selectable only when at least a threshold number of partitions are initially possible.

17. The system of claim 16, further comprising a data storage location comprising the plurality of elements selectively viewable by the user via the paging control elements formatted by the paging control program logic.

18. The system of claim 16, wherein the paging control program logic is further configured to re-format the currently selected memory page upon a user selecting a new memory page to be the currently selected memory page.

* * * * *